United States Patent Office 3,407,924
Patented Oct. 29, 1968

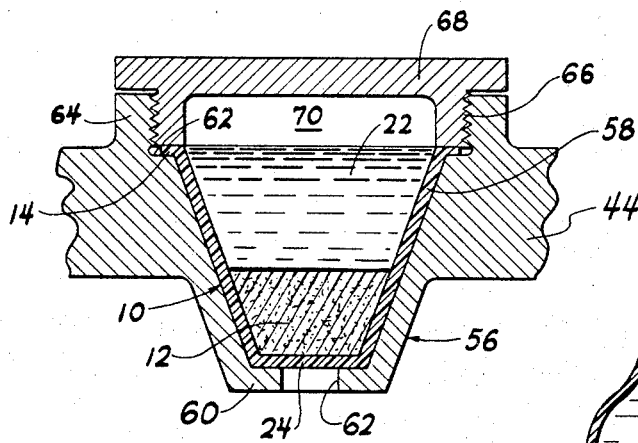
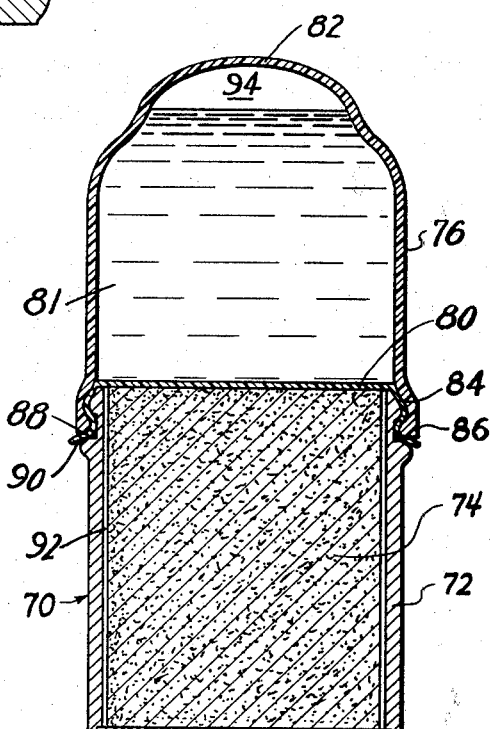
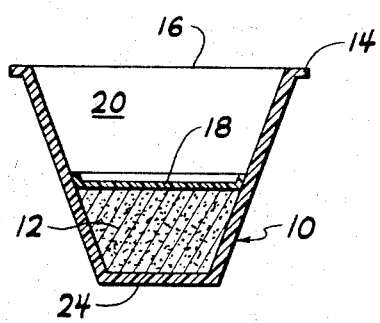

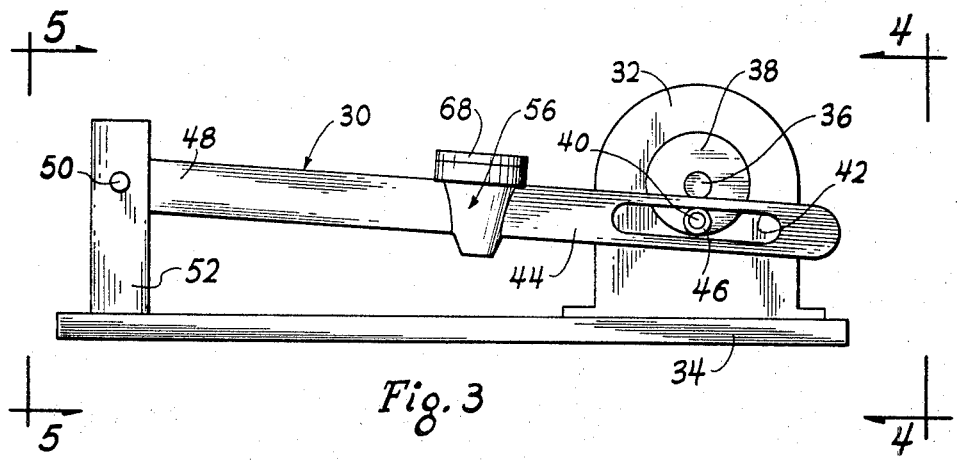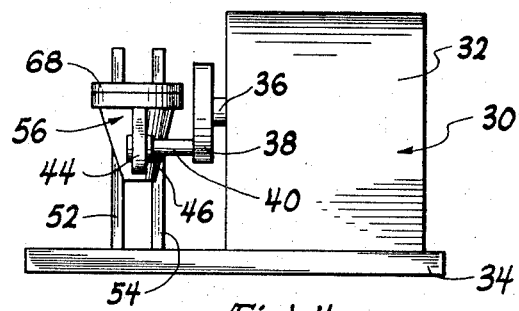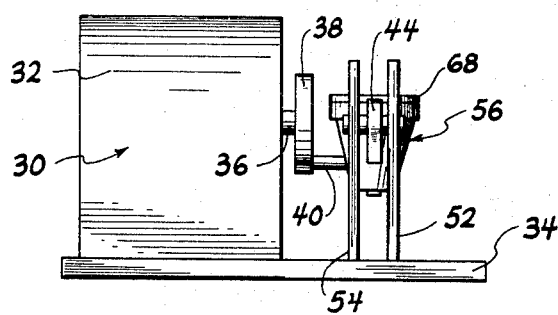

3,407,924
METHOD AND PACKAGE FOR PRODUCING DENTAL MOLDS OR MOLDING MATERIAL
Eugene W. Lewis, Fuller Warden, Jack H. Mills, and Bernard F. McNickle, all of 3323 E. 31st St., Tulsa, Okla. 74105
Continuation-in-part of application Ser. No. 530,196, Feb. 25, 1966. This application July 18, 1966, Ser. No. 565,994
13 Claims. (Cl. 206—63.5)

ABSTRACT OF THE DISCLOSURE

A package unit of a container having a gypsum powder material compressed and sealed therein and the method of producing a liquid-gypsum mixture used in dental application.

---

This application is a continuation-in-part of our copending application Ser. No. 530,196, filed Feb. 25, 1966, and entitled "Method and Package for Producing Dental Molds or Molding Material." This invention relates to improvements in the method and means for producing reproductions and models from dental molds, and more particularly, but not by way of limitation, to a novel method and means for producing the molding material for making reproductions from dental impressions or molds, or the like.

The most common method in use today for making models and reproductions from dental impressions, and the like, comprises the use of gypsum materials which are mixed with water (or other suitable mixing additives) in the desired proportions to obtain the desired consistency for the resultant molding material. This is usually accomplished by mixing the water with a quantity of the gypsum powder which is usually measured from a bulk supply of the gypsum material. The powdered gypsum is usually weighed and the water measured to provide the desired consistency or the best results. However, as a practical matter the most usual method in normal practice actually consists of placing a visually estimated amount of water in a rubber mixing bowl and manually dumping, or more preferably sifting an estimated quantity of the powder into the water. This technique usually requires a secondary addition of either the powder or the water to achieve an approximately correct consistency for the mixture. The ingredients are then mixed by manual stirring thereof with a spatula, or by a mechanical or motor driven spatulator, until a creamy mass results. As the mixture is being spatulated, the mixing bowl or container is usually disposed in or held against a vibrating mechanism or machine in order to agitate the mixture for release of as many air bubbles as possible therefrom.

The amount of air content normally present in bulk gypsum powders is substantially great, and the materials produced by use thereof are usually exceedingly porous. Of course, the presence of air is undesirable in a material which is to be used for producing non-porous models, such as dental reproductions, and the like. In order to reduce the presence of air in the mixture produced by the above method, the material may be placed in a vacuuming machine for a time period of approximately forty-five seconds to one minute. However, since the size and cost of this vacuuming equipment is often excessive, very few dentists, and only some of the dental laboratories are equipped with any air removing devices.

The present method for producing the gypsum materials for dental models, and the like, as hereinbefore set forth, usually requires from one to three minutes in spatulation, another minute of vacuuming, if vacuumed, and at least an additional minute in measuring the ingredients, and in the cleaning up of the mixing equipment and tools subsequent to the mixing operation. Of course, after the mixture has been completed, the material is poured into an impression or mold, after which it sets up in a hard mass, as is well known.

The present invention contemplates a novel method and means for preparing gypsum products for the making of models, reproductions, or the like, from dental molds, or other related uses. The novel method comprises broadly the following steps:

(1) Precompression of a gypsum powder to decrease the volume and remove substantially all the air
(2) Adding water to the compressed powder in an accurate predetermined quantity
(3) Providing violent agitation of the powder and water to provide a superior end product.

The powdered gypsum product, such as plaster, hydrocal, investment, and the like, is packaged within a suitable mixing container, which may be disposable, and in an exact premeasured quantity. The powder is then compressed in any suitable manner for removing air therefrom and reducing the volume thereof. The compressed powder is then sealed in the container in such a manner that approximately 62 percent of the air is removed and the volume of the powder is reduced by approximately 40 percent. In the agitating operation or subsequent mixing procedure during which the powder is mixed with water or any other suitable liquid, substantially all the remaining air is removed from the liquid-powder mixture so that the original powdered product occupies only approximately 36 percent of the original volume thereof, and the resultant liquid-powder mixture is substantially free of detrimental air voids which cause failures in the surface of dental restorations.

The container in which the compressed powder is sealed is provided with an area or chamber separated from the powder and which is of a volumetric content substantially equal to the volume of water that is considered preferable for mixing with the preselected quantity of powder and which is to be mixed or added to the powder. The powdered product may be packaged with only the compressed powder sealed within the container or package and with a separate open or empty compartment being provided for receiving the mixing liquid at the time the material for the reproduction process is to be mixed. Alternatively, the ingredients for the end product may be packaged in a single unit with the premeasured compressed powder sealed in one compartment and the premeasured quantity of the mixing liquid sealed in an adjacent compartment, with a rupturable membrane, or the like, separating the compartments whereby the liquid and powder may be intermingled at the desired time for producing the resultant material for the molding operation. In any event, the powder-liquid mixture may be violently agitated in any well known manner, and preferably by means of the agitating device disclosed herein whereby the mixture will be thoroughly mixed to provide an end product which is superior to that available with the present methods, and to produce the end product in a minimum of time. The novel method and means substantially eliminates any guess work such as now frequently employed in this type of mixing, and provides a mixture based on the most desirable liquid-powder ratio.

When it is desired to use the package provided with both the powdered and liquid ingredients sealed therein, the membrane separating the two elements is ruptured and the package containing both the liquid, or water and the powder is vigorously agitated in a mechanical mixer (similar to that depicted herein) for a sufficient period of time, generally approximately five seconds, to provide thorough and adequate mixing of the powder and water. The rupturing of the diaphragm may be accomplished in several different ways, for example, by the use of a tear strip where the upper end of the cylinder or container is provided with a removable cap with a cord connecting from the cap to the tearable portion of the diaphragm or membrane. Thus, at the time of intended use the removable cap is removed, tearing the membrane. The torn portion is removed from the cap and the cap is re-seated prior to the mixing step. Another way of providing a frangible diaphragm is to attach one peripheral portion thereof to the one portion of a container and another periphery portion to a portion of a separable container. Then, at the time of intended use of the package, one container is rotated with respect to the other container, and the membrane is torn. After the mixing step is completed, the upper container portion may be removed and discarded, and the lower container portion will contain or will be filled with a properly proportioned and homogeneous mixture of powder and water.

When it is desired to use the package containing only the premeasured compressed powder sealed therein with the empty compartment separated therefrom, the liquid may be added to the empty compartment until the compartment is completely filled or filled to the indicated marker. The seal member may then be ruptured, or broken, in any well known manner, and the entire container may be disposed within agitating device, preferably the agitating mechanism depicted herein. The container is disposed within the receiving portion of the agitator, and a cap member is then secured on the receiving portion for sealing the container therein. A slight air space is retained between the water level and the cap member to provide a mixing area. The container is then violently agitated and the powder and water are thoroughly mixed to provide a resultant homogeneous mixture which is of the proper proportions, and which is substantially free of air voids.

It is an important object of this invention to provide a novel method for producing a gypsum-liquid material for models and reproductions from dental molds, and the like, in a manner wherein air voids are substantially eliminated from the resultant gypsum-liquid mixture.

It is another object of this invention to provide a novel method of packaging a gypsum product in powdered form whereby the powder is provided in premeasured quantities for facilitating the production of a liquid-gypsum end product.

Another object of this invention is to provide a novel method of packaging a premeasured quantity of a powdered gypsum product which is precompressed for removal of air and reduction of volume of the powder to produce a superior end product substantially free of air voids.

Still another object of this invention is to provide a novel means for facilitating the mixing of a premeasured quantity of powdered gypsum and a premeasured quantity of liquid to provide a homogeneous end product which is substantially free of air voids.

It is a further object of this invention to provide a novel package in which both of the powdered and liquid ingredients for a dental model material are contained within the package.

It is still a further object of this invention to provide a novel package in which only the premeasured and precompressed powered ingredient of a dental model material is sealed therein with a separate chamber being provided for receiving a predetermined quantity of liquid therein.

A still further object of this invention is to provide a novel package which serves as the mixing container for the dental model material.

Another object of this invention is to provide a novel method and means in which the powder and water ingredients of a dental model material, or the like, can be joined together in a quick and easy fashion when ready for use.

Still another object of this invention is to provide a novel method and means for providing the powder and water ingredients of a dental model material, or the like, in their exact proportions, weights and volumes.

It is another object of this invention to provide a novel package, the ingredients of which may be thoroughly mixed in a closed system without the incorporation of additional air.

Another object of this invention is to provide a novel package for powdered and liquid ingredients which is disposable.

It is also an object of this invention to provide a unique and novel method and means for producing a model material for dental operations whereby the end product is accomplished through controlled and automatic accuracy by means of the novel mixing and packaging method.

Other and further objects and advantageous features of the present invention will hereinafter more fully appear in connection with a detailed description of the drawing in which:

FIGURE 1 is a sectional elevational view of a container embodying the invention.

FIGURE 2 is a sectional elevational view of a container embodying a modification of the invention.

FIGURE 3 is a front elevational view of an agitator apparatus embodying the invention.

FIGURE 4 is a view taken on line 4—4 of FIGURE 3.

FIGURE 5 is a view taken on line 5—5 of FIGURE 3.

FIGURE 6 is a sectional view of the container and receptacle of the agitator apparatus.

Referring to the drawings in detail, and particularly FIGURE 1, a container 10 is provided for receiving a suitable precompressed gypsum powder 12 in the lower portion thereof. The container 10 may be constructed from any suitable material, however it is preferable that the container 10 be constructed from a disposable plastic material of sufficient rigidity to withstand the agitation operation, as will be hereinafter set forth, and of a light weight construction. The container 10 as depicted in FIGURE 1 is preferably of a substantially conical configuration generally similar to the well known Dixie Cup widely used for cold drinks, and the like. It will be apparent, however, that the configuration of the cup or container 10 may be of any dasired shape. An outwardly extending circumferential flange 14 is provided around the upper open end 16 of the container 10 for a purpose as will be hereinafter set forth.

The quantity of powder 12 is premeasured prior to insertion thereon into the container in order to provide substantially the exact amount thereof required for producing the optimum end product. The premeasured powder 12 is then compressed in any well known manner (not shown) and sealed within the lower portion of the container 10 by means of a suitable sealing member 18 whereby substantially 62 percent of the air is removed from the powder 12 and the volume of the powder is reduced by approximately 40 percent. The sealing member 18 separates the lower portion of the container which contains the powder from the upper portion thereof whereby an empty chamber 20 is provided in the container 10. The volume of the chamber 20 is preferably substantially exactly equal to the volume of the liquid 22 (FIGURE 6) to be added to the powder 12 to produce the desired end product. Thus, the chamber 20 may be readily completely filled with the liquid 22 to provide the premeasured quantity thereof for the optimum ratio with regard to the quantity of the powder 12. Of course, alternatively, a suitable measuring line or indication means (not shown) may be provided on the inner periphery of the chamber 20 to indicate the level for filling thereof with the water, or other liquid additive.

The seal member 18 may be of any suitable type, and may be removably disposed within the container 10 in any well known manner whereby the seal 18 may be removed immediately subsequent to the addition of the water in the chamber 20. For example, the seal member 18 may be provided with a tab or pull member (not shown), or the like, which may be grasped manually for lifting the seal 18 from its position within the cup or container. As an alternate means of sealing the powder 12 within the container 10, it may be desirable to superimpose or stack a plurality of the containers 10 for storage purposes. In this event, each container 10 may be provided with an inwardly directed annular flange or rib member (not shown) spaced therein at the height or distance from the bottom 24 of the container to define a chamber for receiving the compressed powder 12. The bottom 24 of the next succeeding container 10 may then be pressed or snapped into an engagement with the rib member to seal the powder in the lowermost container 10. As one of the containers 10 is to be utilized for mixing of the liquid-powder products, the lowermost container 10 may be removed from the engagement with the container stacked or superimposed thereon for breaking the seal of the powder and permitting addition of the water or other liquid additive to the removed container 10.

Subsequent to the addition of the water in the chamber 20, the water-powder mixture may be violently agitated in any desired manner to provide a thorough mixing thereof. It is deemed preferable to utilize the agitator apparatus generally indicated at 30 in FIGURES 3 through 6.

The agitator device 30 comprises a motor 32 mounted on a base plate 34, or the like. The motor 32 may be of any suitable type, but it is preferable to utilize a motor having an output of 1750 r.p.m. to achieve the desired results of agitation, as will be hereinafter set forth. The motor 32 is provided with the usual output shaft 36 having a wheel 38 secured to the outer end thereof for rotation simultaneously therewith. A peg or pin member 40 is secured to the outer face of the wheel 38 in any well known manner and extends axially outwardly therefrom, with the axis of the pin 40 being substantially parallel with and spaced from the axis of the output shaft 36. Of course, the distance between the axis of the pin 40 and shaft 36 may be of substantially any desired length, but as a practical matter it has been found that a distance of one half inch, in combination with the 1750 r.p.m. output of the motor 32 provides a very efficient agitation operation. The pin member 40 extends through an elongated aperture 42 provided in the proximity of one end of a pivotal arm member 44. A suitable bearing member 46 is provided in the proximity of the outer end of the pin 40 for riding in the slot 42 during the pivotal movement of the arm 44 as will be hereinafter set forth.

The opposite end 48 of the arm 44 is pivotally secured at 50 to a pair of spaced upright post members 52 and 54. A receptacle member 56 is interposed between the pivot 50 and slot 42 and may be either suitably secured to the arm 44 or may be integral therewith. The receptacle 56 is provided for reciving the container 10, and is preferably of a configuration generally similar thereto, as particularly shown in FIGURE 6.

The receptacle 56 is provided with an internal chamber 58 of a generally conical configuration corresponding to the outer configuration of the container 10 for receiving the container 10 therein. The lower wall or bottom 60 of the receptacle portion 56 is provided with an aperture 62 for facilitating removal of the container 10 from the chamber 58 subsequent to the agitation operation. An annular shoulder 62 is provided on the inner periphery of the chamber 58 in the proximity of the upper end thereof for receiving the flange 14 thereagainst. An upwardly extending circular flange 64 is provided at the upper end of the receptacle 56 and is internally threaded at 66 for receiving a suitable threaded cap member 68 therein. A mixing area 70 is provided between the upper level of the container 10 and the lower internal surface of the cap 68 for facilitating the mixing of the liquid 22 and powder 12 during the agitation operation.

Of course, it will be apparent that a second receptacle member (not shown) may also be provided on the arm 44, and may be either carried at the outer extremity of the arm beyond the pin member 40, or disposed between the pivot 50 and pin 40. The second (or other) receptacles may be either of substantially the same size as the receptacle 56, or of either larger or smaller sizes in order to receive containers 10 of varying sizes for agitation thereof. In addition, it may be desirable to provide a suitable adaptor member (not shown) for insertion within the chamber 58 of the receptacle 56 for adapting the size of the chamber 58 for substantially any size container 10. Of course, the adaptor member may be of a generally similar configuration as the chamber 58 and container 10, or any other desired shape as practical.

When it is desired to provide a gypsum-liquid material for making a model or reproduction from a dental mold, or the like, one of the containers 10 may be selected which is prepacked with the desired quantity of powder 12 in accordance with the desired end product. The premeasured precompressed powder 12 is sealed within the container 10, as hereinbefore set forth, and when it is desired to produce the water-powder mixture, the seal member 18 may be removed from the container 10 in any well known manner, and the chamber or area 20 above the powder 12 may be filled to the brim (or to the filling indicator line) with the water, or other liquid, to be added to the powder. The container 10 thus filled with the water and powder ingredients may then be disposed within the chamber 58 of the receptacle 56 as shown in FIGURE 6. The cap member 68 is then threadedly secured on the receptacle 56 whereby the cap 68 engages the lip or flange 14 of the container 10 to secure the container within the chamber 58 and to provide a seal therebetween in order to preclude leakage of the mixture during the agitation operation. The motor 32 may then be activated in the usual manner whereby the shaft 36 is rotated for rotating the pin 40 in a circular path about the axis of the shaft 36. The engagement between the bearing 46 and slot 42 causes the arm 44 to oscillate very rapidly about the pivot 50 whereby the receptacle 56 and container 10 therein are violently agitated. The area 70 above the liquid level provides a mixing area, and the powder and liquid are thoroughly mixed after approximately five seconds of agitation.

The motor 32 may then be stopped, and the cap 68 may be removed to permit access to the container 10. The container 10 may be removed from the chamber 58 by manual upward pressure on the bottom 24 through the aperture 62. The container 10 will contain a thoroughly mixed or homogeneous mixture which is substantially free of air voids. Of course, the container 10 may be discarded, if desired, subsequent to removal of the water-powder mixture therefrom, thus eliminating or greatly reducing the clean-up operation after the mixing of the material.

Referring now to FIGURE 2, a modified form of the invention is depicted therein which comprises a container 70 including a lower generally cylindrical member 72 for receiving a premeasured quantity of precompressed powder 74, and an upper substantially cylindrical member 76. The cylindrical members 72 and 76 may be constructed of any suitable material; for example the cylinder 72 may be of a metallic construction, and the cylinder 76 may be of a plastic construction; or both cylinders 72 and 76 may be constructed from a suitable plastic material whereby the entire container 70 may be disposable. The lower end of the cylindrical member 72 is sealed or closed by a disc member 78, which may be of plastic material. A rupturable diaphragm or membrane 80 is sealed against the upper end of the cylinder 72 after the cylinder 72 has been filled with the compacted powder 74 as will be hereinafter set forth.

The upper end of the cylindrical member 76 is provided for retaining a supply of liquid 81 which corresponds in quantity with the most desirable ratio of water to the powder 74 contained within the cylinder 72. The upper end of the cylinder 76 may be closed in any suitable manner after the addition of the liquid, such as by a dome shaped member 82 which may be bonded to the cylinder 76 in a manner that the two pieces become integral. The upper end of the cylinder 72 is provided with an outwardly extending lip 84 and the lower end of the cylinder 76 is provided with an inwardly directed lip 86 which cooperates with the lip 84 to provide a fluid tight seal when the member 76 is telescoped over the lower member 72. An outwardly projecting shoulder 88 is provided on the cylindrical member 72 as a stop to prevent further downward movement of the member 76 beyond that shown in FIGURE 2. The shape of the lips 84 and 86 are (and indeed their presence) is not critical as far as the present invention is concerned just so long as the upper member 76 is adapted to fit snugly against the top of the lower cylindrical member 72 as shown in the drawings.

The diaphragm 80 resting against the top of the cylindrical member 72 extends downwardly between the intermating portions of the members 72 and 76 and extends somewhat outwardly as at 90.

Prior to filling the lower cylinder 72 with the powdered product 74 it may be desirable to cover the inside surface with a thin layer 92 of asbestos material to compensate for expansion of the powder and also to provide a path of escape for any gases that are generated during the heating and casting operation; to the extent that the strip 92 might be considered as a spacer for expansion of the powder, the use of this asbestos sheeting may be eliminated because the member 72, being of a thin and disposable nature, may allow for adequate expansion by itself.

A quantity of the powder 74 is compacted into the interior of the cylindrical member 72 by compression; if the compression forces are sufficiently complete and/or uniform the amount of powder 74 contained within the cylinder 72 will be the same in each case because the internal volume of the cylinder 72 will be constant. However, the cylinder 72 can be weighed before and after filling with the powder 74 to insure an accurate quantity of powder therein. Heretofore attempts have been made to eliminate the air from the powder mix by means of agitating and/or vacuuming by the utilization of machines designed for these purposes. However, it has been discovered that either or both of the expedients have been largely unsuccessful in removing the air from the powder as desired. The powder itself can be purchased in bulk form or in pre-weighed package generally containing about 50 grams. These 50 grams generally occupy about 55 cc. of volume. By using mechanical compression on the powder it has been discovered that a 50 gram sample, which would normally occupy approximately 50 cc. of volume, can be compressed to about 30 cc. of volume which means that about 20 cc. of air has been removed.

After the cylinder 72 has been filled with compacted powder 74, the diaphragm 80 is placed over the top and held in position while the member 72 is inverted from the upright position shown in FIGURE 2. Any convenient means can be employed to hold the membrane 80 in this position during the assembly. At this point a quantity of adhesive material (not shown) is applied to the outer surface of the lip 84 and extends therearound for approximately 180°. At the same time a second quantity of adhesive material is placed on the inside of the member 76 generally inwardly of the lip 86 and also extends therearound for approximately 180°. When considering the ultimate juncture the 180° portion of adhesive on the lip 84 is oppositely disposed from the 180° portion of adhesive on the lip 86. Thereafter, the cylinder 76 is urged downwardly and over the upper end of the lower cylinder 72, forcing the diaphragm 80 against the lip 84 and at the same time against the inside of the container 76. Thus, the membrane 80 adheres to the adhesive portion on the lip 84 and to the adhesive portion on the lip 86. It must be noted now that one portion of the diaphragm 80 is connected adhesively to the lower container 72 and another portion is adhesively connected to the upper cylinder 76. During the aforementioned assembly, it is preferable that the bottom portion of the container 76 should be compressed slightly so as to reduce the volume thereof in order to compenaste for the compression resulting from the combination of the two members. After the assembly has been completed, however, and the pressure is released from against the bottom of the member 76, it can return to its original volume and thus the compressive force is fully compensated. Naturally, if the assembly takes place in an evacuated or partially evacuated area, no concern need be given to any deliberate squeezing of the outer end of the member 76.

After the upper cylinder 76 has been assembled with the lower cylinder 72, the premeasured volume of quantity of liquid 81 may be placed or inserted into the upper cylinder 76. The cover or dome shaped member 82 may then be placed on top of the cylinder 76 and cemented in position, or bonded thereto to provide a sealed package for the water and powder ingredients. A mixing area or air space 94 is provided between the upper level of the water (or other liquid additive) 81 to permit mixing of the water and powder ingredients.

When it is desired to produce a material for a dental reproduction, or the like, the upper cylinder 76 may be manually rotated or twisted slightly with respect to the lower cylinder 72 for causing a rupturing of the diaphragm 80, thereby joining the ingredients within the container 70 without violating the closed container system. The entire sealed container 70 may then be disposed in an agitating device similar to that depicted in FIGURES 3 through 6 whereby the water and powder will be thoroughly mixed to produce a superior homogeneous mixture which is substantially free of air voids. Of course, any other suitable means of agitation may be utilized for the mixing of the ingredients.

Subsequent to the agitation operation, the upper cylinder 76 may be removed from the engagement with the lower cylinder 72 and the mixture will be contained within the lower cylinder 72. The material thus produced may then be utilized in the usual manner for making a reproduction of a dental impression, or the like, bearing in mind that the product is superior than that possible with the present day methods. In addition, both the cylinders 76 and 72 may be discarded after use, which eliminates or greatly reduces the clean up operation after the production of the water-powder material.

From the foregoing it will be apparent that many of the steps of the prior art have been eliminated. For example, there is no need to mix the powdered product separately and as a result there is no need to clean a separate vessel or any of the implements necessary for the mixing operation. There is no need to attempt to apply a vacuum to remove air from the powder because this has already been accomplished by the compacting process. The container of the pre-measured ingredients may be discarded subsequent to the production of the end product thus eliminating or substantially reducing the clean up operation. With regard to the materials which may be provided in the packages and method of the present invention, it will be apparent that any other material having the same characteristics as the gypsum powder and water may be utilized and it is recognized that the dentistry profession utilizes many molds which are prepared from a powder-liquid mixture. These would include the various plaster, stones, acrylics, alginates, or the like. The method and means of the present invention may be utilized for providing the dentist or the dental technician preweighed and preportioned quantities of powder and liquid for any one of several molding mixtures to produce a superior resultant end product which is of a homogeneous mixture and substantially free from air voids.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A method of providing powdered gypsum for a resultant liquid-gypsum mixture for dental applications which consists of placing a premeasured quantity of the gypsum in a container, removing substantially all the air from the gypsum whereby said resultant liquid-gypsum mixture will be substantially free of air voids, and sealing the premeasured substantially airless gypsum in a portion of the container.

2. A method of providing a powdered gypsum for a resultant liquid-gypsum mixture for dental applications as set forth in claim 1 wherein an area is provided adjacent to but separate from the sealed gypsum for receiving a premeasured quantity of the liquid.

3. A method of producing a liquid-gypsum mixture for dental applications which consists of an initial step of removing substantially all the air from the gypsum, adding the liquid to the gypsum subsequent to the removal of the air therefrom, and mixing the liquid with the gypsum to remove substantially all the remaining air and to provide a homogeneous mixture which is substantially free of air voids.

4. A method of producing a liquid-gypsum mixture as set forth in claim 3 wherein the gypsum is premeasured prior to the removal of the air therefrom, and the quantity of liquid is premeasured in proportion to the quantity of the gypsum.

5. A method of producing a liquid-gypsum mixture as set forth in claim 3 wherein the substantially airless gypsum is sealed in a container.

6. A method of producing a liquid-gypsum mixture as set forth in claim 5 wherein an area of predetermined volume is provided for receiving substantially the exact quantity of liquid in proportion to the gypsum sealed in the container.

7. A packaged unit for a liquid-gypsum mixture for dental applications which comprises a container, a premeasured quantity of gypsum sealed in one portion of the container, said gypsum having substantially all the air removed therefrom prior to the sealing thereof in the container, a chamber provided in the container for receiving a liquid therein whereby the liquid and gypsum may be mixed within said container to provide a homogeneous mixture which is substantially free of air voids.

8. A packaged unit for a liquid-gypsum mixture for dental applications as set forth in claim 7 wherein the substantially airless gypsum is of a premeasured quantity, and the liquid receiving chamber is of a preselected volume for receiving substantially exactly the proper quantity of liquid in proportion to the gypsum.

9. A packaged unit for a liquid-gypsum mixture for dental applications at set forth in claim 7 wherein a seal member is disposed within the container for sealing the gypsum therein, said seal member being movable upon the application of force whereby the liquid and gypsum ingredients may be admixed to provide a resultant liquid-gypsum mixture which is substantially free from air voids.

10. A packaged unit for a liquid-gypsum mixture for dental applications as set forth in claim 7 wherein the liquid receiving chamber is sealed subsequent to the addition of the liquid therein in order that the entire container may be utilized for mixing the liquid and gypsum to provide said homogeneous mixture which is substantially free of air voids.

11. A package unit for facilitating the production of a liquid-gypsum mixture for dental applications which comprises a container, a premeasured quantity of gypsum disposed in the lower portion of the container, said gypsum having substantially all the air removed therefrom, a movable seal member disposed in the container adjacent the upper level of the gypsum for sealing the substantially airless gypsum within the container, and a liquid receiving chamber provided in the container adjacent the seal member and separated from the gypsum by the seal member whereby the liquid and gypsum cannot be inadvertently mixed.

12. A package unit for facilitating the production of a liquid-gypsum mixture for dental application as set forth in claim 11 wherein the liquid receiving chamber is of a preselected volume for retaining substantially the exact quantity of liquid in proportion to the quantity of the gypsum sealed within the container.

13. A method of providing a powdered gypsum for a resultant liquid-gypsum mixture which consists of placing a premeasured quantity of gypsum in a container, removing substantially all the air from the gypsum, sealing the premeasured substantially airless gypsum in a portion of the container, providing an area of preselected volume adjacent to but separate from the sealed gypsum for receiving and automatically measuring a quantity of liquid to provide the desired liquid-gypsum ratio.

References Cited

UNITED STATES PATENTS

| | | | |
|---|---|---|---|
| 1,770,118 | 7/1930 | Williams | 206—47 |
| 1,889,111 | 11/1932 | Serr | 206—47 |
| 2,759,712 | 8/1956 | Hvistendahl | 259—72 |
| 2,959,900 | 11/1960 | Wollett | 53—24 |
| 3,056,244 | 10/1962 | Bartels | 53—24 |
| 3,128,082 | 4/1964 | Cline | 259—72 |

WILLIAM T. DIXSON, Jr., *Primary Examiner.*